Dec. 15, 1953 R. A. GORDON 2,662,577
METHOD OF MAKING TRIMMING
Filed April 13, 1953 2 Sheets-Sheet 1
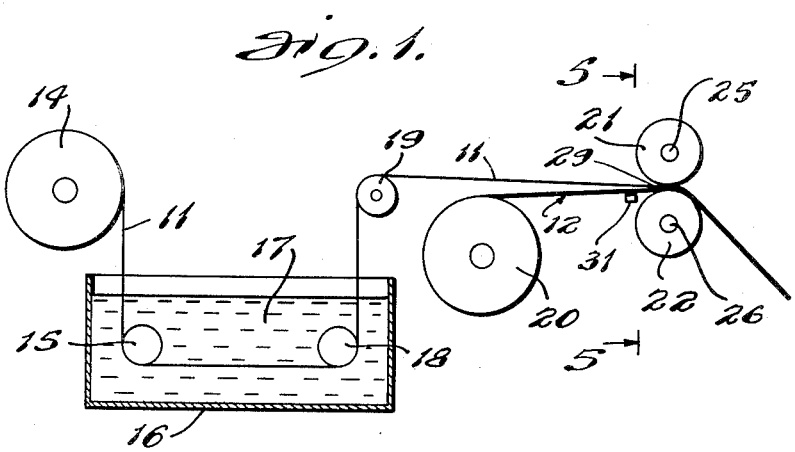
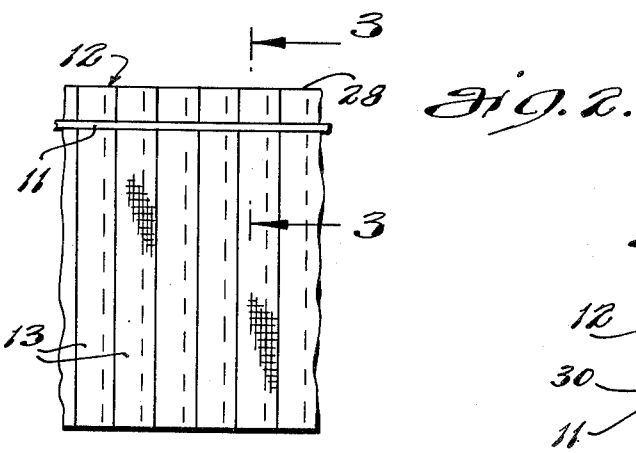
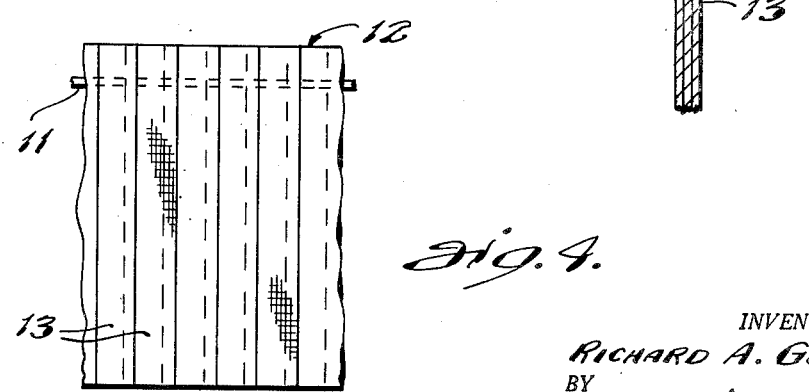
INVENTOR.
RICHARD A. GORDON
BY
J. Walter Bader
ATTORNEY Dec. 15, 1953  R. A. GORDON  2,662,577
METHOD OF MAKING TRIMMING
Filed April 13, 1953  2 Sheets-Sheet 2

INVENTOR.
RICHARD A. GORDON
BY J. Walton Bader
ATTORNEY

Patented Dec. 15, 1953

2,662,577

UNITED STATES PATENT OFFICE 2,662,577

METHOD OF MAKING TRIMMING

Richard A. Gordon, Brooklyn, N. Y.

Application April 13, 1953, Serial No. 348,476

11 Claims. (Cl. 154—33.05)

This invention relates to trimming which is generally used as ornamentation for women's undergarments. The invention is also applicable to any process where it is necessary to secure portions of fabric together by means of a securing member.

Where trimming is made by this invention the trimming is generally formed of netted thermoplastic fabric, and in the preferred modification thereof with a plurality of vertical plaits and a securing member longitudinally disposed thereon holding the lateral edges of the plaits together. Such trimming is generally formed by first pleating the fabric into vertical plaits and thence disposing a tape member provided with pressure sensitive adhesive upon its underside across said fabric in the region of one of its transverse extremities. After the tape is applied to the fabric a thread is sewn through the tape and the tape is removed. The thread holds the lateral edges of the plaits together.

The conventional process has several disadvantages. Three operations are required to properly form the trimming after the pleating step, namely placing the tape on the fabric, stitching the thread therethrough, and removing the tape.

Attempts have been heretofore made to stitch the thread directly to the tape holding it in place by adhesive. These attempts have been unsatisfactory since the adhesive, having a different density than that of the fabric, would be noticeable and would "spot" the fabric effectively ruining it for trimming use. Heat welding of thermoplastic fabrics was also unsatisfactory since the fabric would be melted and deteriorated at the points of sealing and therefore would show definite "spots."

I have discovered a novel method of making trimming which permits the securing member to be held in place in one operation and which does not cause fabric spotting. I carry out this method by making the fabric itself act as its own adhesive and thereby secure the securing member to the fabric.

The method of this invention comprises the steps of obtaining a swellable thermoplastic fabric, passing the securing member used to hold the fabric through a fabric swelling agent thereby causing a quantity of the swelling agent to adhere to the securing member and thereby impregnating the securing member with the agent which is adapted to swell the fabric, disposing the securing member longitudinally upon the surface of the fabric so that the fabric swells where it is in contact with the securing member, and thence causing the fabric to contract.

By this sequence of steps the securing member is bonded to the fabric and is held in place without the use of any adhesive, and there can be no spotting of the fabric to mar its appearance.

In the preferred modification of this invention the securing member is compressed when the fabric is caused to contract, the contraction being caused by the application of heat. The temperature used is as high as possible but must be below the deterioration point of the fabric. As the term is used in this specification "deterioration point" is that temperature at which the fabric decomposes or changes from the solid to the liquid state.

The invention will now be described by reference to the accompanying drawings which are made a part of this specification.

Fig. 1 is a diagrammatic view of the method of this invention where either an unpleated fabric is used or the fabric has been pleated prior to its entry into the method.

Fig. 2 is a front view of the fabric of this invention.

Fig. 3 is a sectional view of the fabric of this invention taken along lines 3—3 of Fig. 2.

Fig. 4 is a rear view of the fabric of this invention.

Referring now to the method as shown in Figs. 1, 2, 3, 4, and 5 there is shown a swellable fabric 12 which is made of nylon, rayon, or other synthetic thermoplastic fiber. The fabric is generally netted.

Fabric 12 is formed with a plurality of vertical plaits 13 which are held together by securing member 11. Securing member 11 is disposed within recess 30 of fabric 12. The term "vertical" as used in this specification is defined to mean, in addition to the normal meaning of the term, a direction at an angle to the longest dimension of the fabric.

Figure 5:
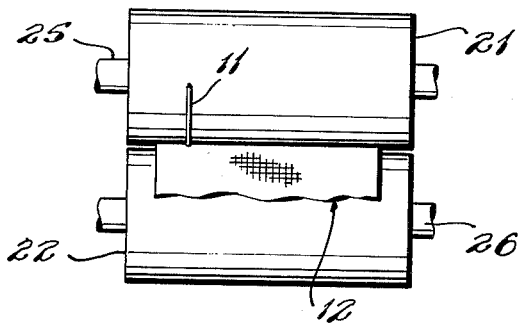
Fig. 5 is a sectional view taken along lines 5—5 of Fig. 1.
Figure 6:
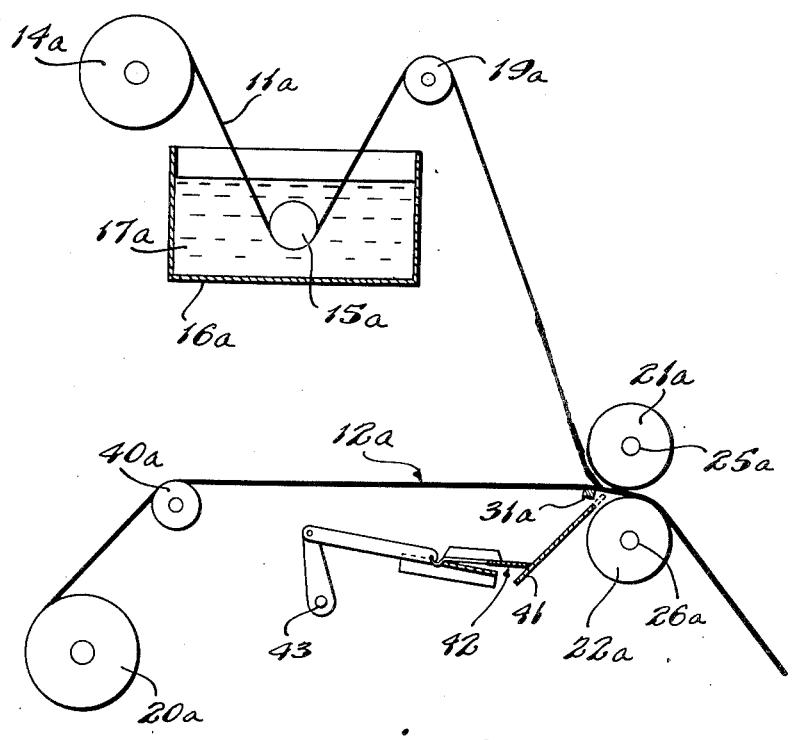
Fig. 6 is a diagrammatic view of the method of this invention where the fabric is pleated at the same time that the securing member is disposed upon it.

The fabric of this invention may be formed by the methods shown in either Fig. 1 or Fig. 6. When the method shown in Fig. 1 is employed the fabric is fed from roll 20 and the securing member, which is a thread, is fed from roll 14. Fabric 12 may be either pleated or unpleated, and, if pleated, has been so formed prior to its disposition upon roll 20.

Thread 11 is fed from roll 14 into tank 16 where it passes over rollers 15 and 18. Tank 16 is filled with fabric swelling agent 17. As thread 11 passes through tank 16 a quantity of the fabric swelling agent adheres to it. Thread 11 is then led over roller 19 and strikes fabric 12 just prior to the passage of fabric 12 between rollers 21 and 22. The point at which thread 11 strikes fabric 12 is indicated in Fig. 1 at 29.

Upon striking fabric 12 thread 11 causes the fabric to swell by reason of the fabric swelling agent which has hit fabric 12 after being carried by thread 11 from tank 16. The swelling of fabric 12 produces a recess therein in which thread 11 fits.

Fabric 12 passes over holding member 31 which assures the proper angle of approach and then both fabric 12 and thread 11 pass together between rollers 21 and 22 which turn upon shafts 25 and 26. Rollers 21 and 22 are heated preferably by electrical means and the temperatures of said rollers are controlled by conventional thermostatic means. The temperatures used are as high as possible so long as they are below the deterioration point of the fabric. With most fabrics the temperature will range from 200° to 500° Fahrenheit and where nylon fabric is used the temperature ranges from 350° to 385° Fahrenheit.

The passage of fabric 12 and securing member 11 through rollers 21 and 22 applies heat and pressure simultaneously to the fabric. The pressure forces securing member 11 into recess 30 and also contracts the swollen portion of the fabric that has produced recess 30. The contraction produced holds securing member 11 firmly within recess 30 so that it cannot be removed from the fabric. This bonding of securing member 11 to fabric 12 has been accomplished without the use of any adhesive. Securing member 11 is held in place by the sides of recess 30. Recess 30 has become smaller than securing member 11 because of the contraction of the fabric produced by the rollers 21 and 22.

In the preferred modification shown in the drawings the angle of approach of securing member 11 to fabric 12 is so chosen so that securing member 11 is disposed upon fabric 12 in a longitudinal direction and is spaced from the upper transverse extremity of fabric 12 as indicated in Fig. 2 and Fig. 4 at 28. The term "longitudinal direction" as used in this specification is defined to mean a substantially horizontal direction along the length of the fabric, where the length is considered to be the longest dimension thereof. It is also noted that where a pleated fabric is employed in this invention securing member 11 holds the lateral edges of the plaits together.

Fig. 6 shows a method which may be employed to apply this invention to a situation where the fabric is pleated and the securing member is applied thereto in one operation. In this modification thread 11a is fed from roll 14a into tank 16a. Tank 16a is filled with fabric swelling agent 17a. Thread 11a passes over roller 15a in tank 16a and causing a quantity of the fabric swelling agent to adhere to thread 11a. Thread 11a is then carried over roller 19a and is caused to strike fabric 12a at a point just ahead of rollers 21a and 22a.

At the same time fabric 12a is fed from roll 20a over roller 40a and over holding member 31a to the junction point with thread 11a. Pleating blade 41 is adapted to move upwardly by the reciprocating movement of arm 42 about pivot 43. This movement is indicated by the phantom lines above blade 41. As blade 41 moves upwardly it creases fabric 12a and causes it to come in contact with thread 11a. As thread 11a strikes fabric 12a it causes a swelling thereof and the formation of a recess. However the fabric has also been doubled upon itself because of the action of blade 41 which has pushed itself into the fabric. When fabric 12a and thread 11a are then led between rollers 21a and 22a which turn upon shafts 25a and 26a the pressure of the rollers and the heat applied to the parts by the rollers not only causes thread 11a to be secured to fabric 12a but also causes thread 11a to hold the lateral edges of the plaits of the fabric together.

Any conventional fabric swelling agent may be used in this invention and the one chosen will depend upon the fabric used. The swelling agent, however, must be powerful and rapid acting since it has only a short time to act. Where nylon fabric is used any of the conventional swelling agents may be employed such as 4% phenol in water, 100% acetic acid, 40% chloro-acetic acid in water, 4% acetic acid in methanol, 100% lactic acid, 4% benzoic acid in methanol, 40% parahydroxy-benzoic acid in methanol, 40% benzene sulfonic acid in water, 4% adipic acid in methanol, 40% phosphoric acid in water, and 40% meta-cresol in water.

I have discovered a superior swelling agent where nylon fabric is used in this invention may be made by mixing equal parts of methanol and water and then dissolving 4% benzoic acid in the solution.

The foregoing specific embodiments of this invention as shown in the foregoing specification and drawings are for illustrative purposes and for purposes of example only. Various changes and modifications may obviously be made within the spirit and scope of this invention and would occur to those skilled in this art.

I claim:

1. A method of making trimming comprising the steps of obtaining a nylon fabric formed with a plurality of vertical plaits, passing a securing member through a nylon swelling agent in liquid form causing a quantity of said liquid to adhere to said securing member, thence longitudinally disposing said securing member upon a surface of said fabric spaced from its upper transverse extremity causing the portion of the fabric in contact with the securing member to swell, applying pressure and heat to said fabric surface, the temperature applied being below the deterioration point of the fabric, the application of heat causing said swollen portion of said fabric to contract so that the securing member is held to the fabric and binds the lateral edges of the plaits to each other.

2. A method of making trimming comprising the steps of obtaining a nylon fabric formed with a plurality of vertical plaits, passing a securing member through a nylon swelling agent in liquid form thereby causing a quantity of said liquid to adhere to said securing member, thence longitudinally disposing said securing member upon a surface of said fabric spaced from its upper transverse extremity thereby causing the portion of the fabric in contact with the securing member to swell, applying pressure and heat to said fabric surface, the temperature ranging from 350°–385° F., the application of heat causing said swollen portion of said fabric to contract so that the securing member is held to the fabric and binds the lateral edges of the plaits to each other.

3. A method of making trimming comprising the steps of obtaining a fabric made of a thermoplastic material formed with a plurality of vertical plaits, passing a securing member through an agent adapted to swell said fabric, said agent being in liquid form, thereby causing a quantity of said liquid to adhere to said securing member, thence longitudinally disposing said securing member upon a surface of said fabric spaced from its upper transverse extremity thereby causing the portion of said fabric in contact with said securing member to swell, applying pressure and heat to said fabric surface, the temperature employed ranging from 200°–500° F. but being below the deterioration point of the fabric, the application of pressure causing the securing member to be pushed into the fabric thereby forming a recess therein and the application of heat causing the swollen portion of the fabric to contract about the securing member so that the securing member is held to the fabric and binds the lateral edges of the plaits to each other.

4. A method of making trimming comprising the steps of obtaining a fabric made of a thermoplastic material, impregnating a securing member with an agent adapted to swell said fabric, disposing said securing member upon a surface of the fabric so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric.

5. A method of making trimming comprising the steps of obtaining a fabric made of a thermoplastic material formed with a plurality of plaits, impregnating a securing member with an agent adapted to swell said fabric, disposing said securing member upon a surface of the fabric across the edge portions of said plaits so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric and binds the edge portions of the plaits to one another.

6. A method of making trimming comprising the steps of obtaining a fabric made of a thermoplastic material formed with a plurality of vertical plaits, impregnating a securing member with an agent adapted to swell said fabric, disposing said securing member upon a surface of the fabric across the edge portions of said plaits so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric and binds the edge portions of the plaits to one another.

7. A method of making trimming comprising the steps of obtaining a nylon netted fabric formed with a plurality of vertical plaits, impregnating a securing member with an agent adapted to swell said fabric, disposing said securing member upon a surface of said fabric across the edge portions of said plaits so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric and binds the edge portions of the plaits to one another.

8. A method of making trimming comprising the steps of obtaining a fabric made of a thermoplastic material formed with a plurality of vertical plaits, impregnating a securing member with an agent adapted to swell said fabric, disposing said securing member upon a surface of the fabric spaced from its upper transverse extremity and across the edge portions of said plaits so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric and binds the edge portions of the plaits to one another.

9. A method of making trimming comprising the steps of obtaining a fabric made of a thermoplastic material formed with a plurality of vertical plaits, impregnating a securing member with an agent adapted to swell said fabric in liquid form, disposing said securing member upon a surface of the fabric across the edge portions of said plaits so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric and binds the edge portions of the plaits to one another.

10. A method of making trimming comprising the steps of obtaining a fabric made of a thermoplastic material, disposing a securing member impregnated with an agent adapted to swell said fabric upon a surface of the fabric so that the part of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric.

11. A method of making trimming comprising the steps of obtaining a fabric made of a thermoplastic material, pleating said fabric, disposing a securing member impregnated with an agent adapted to swell said fabric upon a surface of the fabric across the edge portions of said pleats whereby the portion of the fabric in contact with the securing member is made to swell, applying pressure and heat to the surface of the fabric, the temperature applied being below the deterioration point of the fabric, the application of pressure forcing the securing member into the fabric thereby forming a recess within said fabric and the application of heat contracting the swollen portion of the fabric about the securing member so that the securing member is held to the fabric and binds the edge portions of the pleats to one another.

RICHARD A. GORDON.

References Cited in the file of this patent

UNITED STATES PATENTS

| Number | Name | Date |
|---|---|---|
| 2,033,113 | Cohn | Mar. 10, 1936 |
| 2,041,356 | Kraft | May 19, 1936 |
| 2,107,748 | Cohn | Feb. 8, 1938 |
| 2,144,513 | Smith | Jan. 17, 1939 |
| 2,240,274 | Wade | Apr. 29, 1941 |
| 2,335,190 | Minich | Nov. 23, 1943 |
| 2,403,464 | Smith | July 9, 1946 |
| 2,441,085 | Schneider | May 4, 1948 |
| 2,449,534 | Meyer | Sept. 14, 1948 |
| 2,482,981 | Kamrass | Sept. 27, 1949 |
| 2,484,340 | Gardner | Oct. 11, 1949 |
| 2,555,409 | Hosfield | June 5, 1951 |
| 2,593,090 | Bartosz | Apr. 15, 1952 |